(12) United States Patent
Kracun et al.

(10) Patent No.: US 11,749,267 B2
(45) Date of Patent: Sep. 5, 2023

(54) ADAPTING HOTWORD RECOGNITION BASED ON PERSONALIZED NEGATIVES

(71) Applicant: Google LLC, Mountain View, CA (US)

(72) Inventors: Aleksandar Kracun, New York, NY (US); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 127 days.

(21) Appl. No.: 16/953,510

(22) Filed: Nov. 20, 2020

(65) Prior Publication Data

US 2022/0165277 A1 May 26, 2022

(51) Int. Cl.
| G10L 15/22 | (2006.01) |
| G10L 15/197 | (2013.01) |
| G10L 17/06 | (2013.01) |
| G10L 17/24 | (2013.01) |
| G10L 15/30 | (2013.01) |
| G10L 15/08 | (2006.01) |

(52) U.S. Cl.
CPC ............ *G10L 15/22* (2013.01); *G10L 15/197* (2013.01); *G10L 15/30* (2013.01); *G10L 17/06* (2013.01); *G10L 17/24* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| 9,600,231 | B1 | 3/2017 | Sun et al. | |
| 9,728,188 | B1* | 8/2017 | Rosen | G10L 25/51 |
| 10,074,371 | B1* | 9/2018 | Wang | G10L 15/08 |
| 10,872,599 | B1* | 12/2020 | Wu | G10L 15/08 |
| 2012/0271631 | A1* | 10/2012 | Weng | G10L 15/18 |
| | | | | 704/243 |
| 2014/0278435 | A1* | 9/2014 | Ganong, III | G10L 15/22 |
| | | | | 704/275 |
| 2018/0233150 | A1* | 8/2018 | Gruenstein | G10L 15/32 |
| 2019/0325870 | A1* | 10/2019 | Mitic | G10L 15/22 |
| 2020/0184966 | A1* | 6/2020 | Yavagal | G10L 15/30 |
| 2020/0202856 | A1* | 6/2020 | Ivanov Bonev | G06F 3/167 |

FOREIGN PATENT DOCUMENTS

FI 128000 B 7/2019

* cited by examiner

*Primary Examiner* — Shaun Roberts
(74) *Attorney, Agent, or Firm* — Honigman LLP; Brett A. Krueger; Grant J. Griffith

(57) ABSTRACT

A method for adapting hotword recognition includes receiving audio data characterizing a hotword event detected by a first stage hotword detector in streaming audio captured by a user device. The method also includes processing, using a second stage hotword detector, the audio data to determine whether a hotword is detected by the second stage hot word detector in a first segment of the audio data. When the hotword is not detected by the second stage hotword detector, the method includes, classifying the first segment of the audio data as containing a negative hotword that caused a false detection of the hotword event in the streaming audio by the first stage hotword detector. Based on the first segment of the audio data classified as containing the negative hotword, the method includes updating the first stage hotword detector to prevent triggering the hotword event in subsequent audio data that contains the negative hotword.

30 Claims, 7 Drawing Sheets

ADAPTING HOTWORD RECOGNITION BASED ON PERSONALIZED NEGATIVES

TECHNICAL FIELD

This disclosure relates to adapting hotword recognition based on personalized negatives.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Typically, systems used to detect hotwords in streaming audio generate a probability score indicative of a probability that a hotword is present in the streaming audio. When the probability score satisfies a predetermined threshold, the device initiates the wake-up process.

SUMMARY

One aspect of the disclosure provides a method for adapting hotword recognition based on personalized negatives. The method includes receiving, at data processing hardware, audio data characterizing a hotword event detected by a first stage hotword detector in streaming audio captured by a user device. The method also includes processing, by the data processing hardware, using a second stage hotword detector, the audio data to determine whether a hotword is detected by the second stage hotword detector in a first segment of the audio data. When the hotword is not detected by the second stage hotword detector in the first segment of the audio data, the method includes classifying, by the data processing hardware, the first segment of the audio data as containing a negative hotword that caused a false detection of the hotword event in the streaming audio by the first stage hotword detector. Based on the first segment of the audio data classified as containing the negative hotword, the method includes updating, by the data processing hardware, the first stage hotword detector to prevent triggering the hotword event in subsequent audio data that contains the negative hotword.

Implementations of the disclosure may include one or more of the following optional features. In some implementations, the method further includes, when the hotword is not detected by the second stage hotword detector in the first segment of the audio data suppressing, by the data processing hardware, a wake-up process on the user device for processing the hotword and one or more other terms following the hotword in the streaming audio, and determining, by the data processing hardware, whether an immediate follow-up query was provided by a user of the user device after suppressing the wake-up process on the user device. In these implementations, classifying the first segment of the audio data as containing the negative hotword is further based on determining that, no follow-up query was provided by the user of the user device after suppressing the wake-up process.

In some examples, when the hotword is detected by the second stage hotword detector in the first segment of the audio data, the method further includes processing, by the data processing hardware, a second segment of the audio data that follows the first segment of the audio data to determine whether the second segment of the audio data is indicative of a spoken query-type utterance. In these examples, when the second audio segment of the audio data is not indicative of the spoken query-type utterance, the method also includes: classifying, by the data processing hardware, the first segment of the audio data as containing the negative word, and based on the first segment of the audio data classified as containing the negative hotword, updating, by the data processing hardware, the first stage hotword detector to prevent triggering the hotword event in subsequent audio data that includes the negative hotword. In some implementations, the method further includes, when the second audio segment of the audio data is not indicative of the spoken query-type utterance, determining, by the data processing hardware, whether an immediate follow-up query was provided by a user of the user device. Here, classifying the first segment of the audio data as containing the negative hotword is further based on determining that no follow-up query was provided by the user of the user device. When the second audio segment of the audio data is indicative of the spoken query-type utterance, the method may also include: receiving, at the data processing hardware, a negative interaction result indicating that a user of the user device negatively interacted with results for the spoken query type utterance provided to the user device; classifying, by the data processing hardware, based on the received negative interaction result, the first segment of the audio data as containing the negative hotword; and based on the first segment of the audio data classified as containing the negative hotword, updating, by the data processing hardware, the first stage hotword detector to prevent detecting the hotword event in subsequent audio data that contains the negative hotword.

In some examples, after receiving the audio data characterizing the hotword event detected by the first stage hotword detector, the method further includes receiving, at the data processing hardware, a negative user interaction indicating user suppression of a wake-up process on the user device. Here, classifying the first segment of the audio data as containing the negative hotword is further based on the negative user interaction indicating user suppression of the wake-up process.

Optionally, updating the first stage hotword detector to prevent triggering the hotword event in subsequent audio data may include providing the first segment of the audio data classified as containing the negative hotword to the user device. The user device is configured to retrain the first stage hotword detector using the first segment of audio data classified as containing the negative hotword. In some implementations, the user device is configured to retrain the first stage hotword detector by storing, in memory hardware of the user device, each instance of the first segment of the audio data classified as containing the negative hotword in memory hardware of the user device and retraining the first stage hotword detector based on an aggregation of the number of instances of the first segment of the audio data classified as containing the negative hotword stored in the memory hardware. In these implementations, the user device is further configured to, prior to retraining the first stage hotword detector, determine that a corresponding confidence score associated each instance of the first segment of the audio data classified as containing the negative hotword fails to satisfy a negative hotword threshold score and determine that the number of instances exceeds a threshold number of instances.

Updating the first stage hotword detector to prevent triggering the hotword event in subsequent audio data may include providing the first segment of the audio data classified as containing the negative hotword to the user device. The user device configured to obtain an embedding representation of the first segment of the audio data and store, in memory hardware of the user device, the embedding representation of the first segment of the audio data. Additionally, the user dev ice is configured to determine when subsequent audio data characterizing the hotword event detected by the first stage hotword detector includes the negative hotword by computing an evaluation embedding representation for the audio data, determine a similarity score between the embedding representation of the first segment of the audio data classified as the negative hotword and the evaluation embedding representation for the subsequent audio data; and when the similarity score satisfies a similarity score threshold, determine that the subsequent audio data includes the negative hotword.

In some implementations, the data processing hardware resides on a server in communication with the data processing hardware and the first stage hotword detector executes on a processor of the user device. Processing the audio data to determine whether the hotword is detected by the second stage hotword detector in the first segment of the audio data may include performing automated speech recognition to determine whether the hotword is recognized in the first segment of the audio data.

In some examples, the data processing resides on the user device. In these examples, the first stage hotword detector may execute on a digital signal processor (DSP) of the data processing hardware and the second stage hotword detector executes on an application processor of the data processing hardware. The first stage hotword detector may be configured to generate a probability score that indicates a presence of the hotword in audio features of the streaming audio captured by the user device and detect the hotword event in the streaming audio when the probability score satisfies a hotword detection threshold of the first stage hotword detector.

Another aspect of the disclosure provides a system for adapting hotword recognition based on personalized negatives. The system includes data processing hardware and memory hardware in communication with the data processing hardware. The memory hardware stores instructions that when executed on the data processing hardware cause the data processing hardware to perform operations. The operations include receiving audio data characterizing a hotword event detected by a first stage hotword detector in streaming audio captured by a user device. The operations also include processing, using a second stage hotword detector, the audio data to determine whether a hotword is detected by the second stage hotword detector in a first segment of the audio data. When the hotword is not detected by the second stage hotword detector in the first segment of the audio data, the operations include classifying the first segment of the audio data as containing a negative hotword that caused a false detection of the hotword event in the streaming audio by the first stage hotword detector. Based on the first segment of the audio data classified as containing the negative hotword, the operations include updating the first stage hotword detector to prevent triggering the hotword event in subsequent audio data that contains the negative hotword.

Implementations of the disclosure may include one or more of the following optional features. In some implementations, the operations further include, when the hotword is not detected by the second stage hotword detector in the first segment of the audio data suppressing a wake-up process on the user device for processing the hotword and one or more other terms following the hotword in the streaming audio; and determining whether an immediate follow-up query was provided by a user of the user device after suppressing the wake-up process on the user device. In these implementations, classifying the first segment of the audio data as containing the negative hotword is further based on determining that no follow-up query was provided by the user of the user device after suppressing the wake-up process.

In some examples, when the hotword is detected by the second stage hotword detector in the first segment of the audio data, the operations further include processing a second segment of the audio data that follows the first segment of the audio data to determine whether the second segment of the audio data is indicative of a spoken query-type utterance. In these examples, when the second audio segment of the audio data is not indicative of the spoken query-type utterance, the operations also include classifying the first segment of the audio data as containing the negative word; and based on the First segment of the audio data classified as containing the negative hotword, updating the first stage hotword detector to prevent triggering the hotword event in subsequent audio data that includes the negative hotword. In some implementations, the operations further include, when the second audio segment of the audio data is not indicative of the spoken query-type utterance, determining whether an immediate follow-up query was provided by a user of the user device. Here, classifying the first segment of the audio data as containing the negative hotword is further based on determining that no follow-up query was provided by the user of the user device. When the second audio segment of the audio data is indicative of the spoken query-type utterance, the operations may also include: receiving a negative interaction result indicating that a user of the user device negatively interacted with results for the spoken query type utterance provided to the user device; classifying, based on the received negative interaction result, the first segment of the audio data as containing the negative hotword; and based on the first segment of the audio data classified as containing the negative hotword, updating the first stage hotword detector to prevent detecting the hotword event in subsequent audio data that contains the negative hotword.

In some examples, after receiving the audio data characterizing the hotword event detected by the first stage hotword detector, the operations further include receiving a negative user interaction indicating user suppression of a wake-up process on the user device. Here, classifying the first segment of the audio data as containing the negative hotword is further based on the negative user interaction indicating user suppression of the wake-up process.

Optionally, updating the first stage hotword detector to prevent triggering the hotword event in subsequent audio data may include providing the first segment of the audio data classified as containing the negative hotword to the user device. The user device is configured to retrain the first stage hotword detector using the first segment of audio data classified as containing the negative hotword. In some implementations, the user device is configured to retrain the first stage hotword detector by storing, in memory hardware of the user device, each instance of the first segment of the audio data classified as containing the negative hotword in memory hardware of the user device and retraining the first stage hotword detector based on an aggregation of the number of instances of the first segment of the audio data classified as containing the negative hotword stored in the memory hardware. In these implementations, the user device is further configured to, prior to retraining the first stage hotword detector, determine that a corresponding confidence score associated each instance of the first segment of the audio data classified as containing the negative hotword fails to satisfy a negative hotword threshold score and determine that the number of instances exceeds a threshold number of instances.

Updating the first stage hotword detector to prevent triggering the hotword event in subsequent audio data may include providing the first segment of the audio data classified as containing the negative hotword to the user device. The user device configured to obtain an embedding representation of the first segment of the audio data and store, in memory hardware of the user device, the embedding representation of the first segment of the audio data. Additionally, the user device is configured to determine when subsequent audio data characterizing the hotword event detected by the first stage hotword detector includes the negative hotword by: computing an evaluation embedding representation for the audio data; determine a similarity score between the embedding representation of the first segment of the audio data classified as the negative hotword and the evaluation embedding representation for the subsequent audio data; and when the similarity score satisfies a similarity score threshold, determine that the subsequent audio data includes the negative hotword.

In some implementations, the data processing hardware resides on a server in communication with the data processing hardware and the first stage hotword detector executes on a processor of the user device. Processing the audio data to determine whether the hotword is detected by the second stage hotword detector in the first segment of the audio data may include performing automated speech recognition to determine whether the hotword is recognized in the first segment of the audio data.

In some examples, the data processing resides on the user device. In these examples, the first stage hotword detector may execute on a digital signal processor (DSP) of the data processing hardware and the second stage hotword detector executes on an application processor of the data processing hardware. The first stage hotword detector may be configured to generate a probability score indicating a presence of the hotword in audio features of the streaming audio captured by the user device and detect the hotword event in the streaming audio when the probability score satisfies a hotword detection threshold of the first stage hotword detector.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
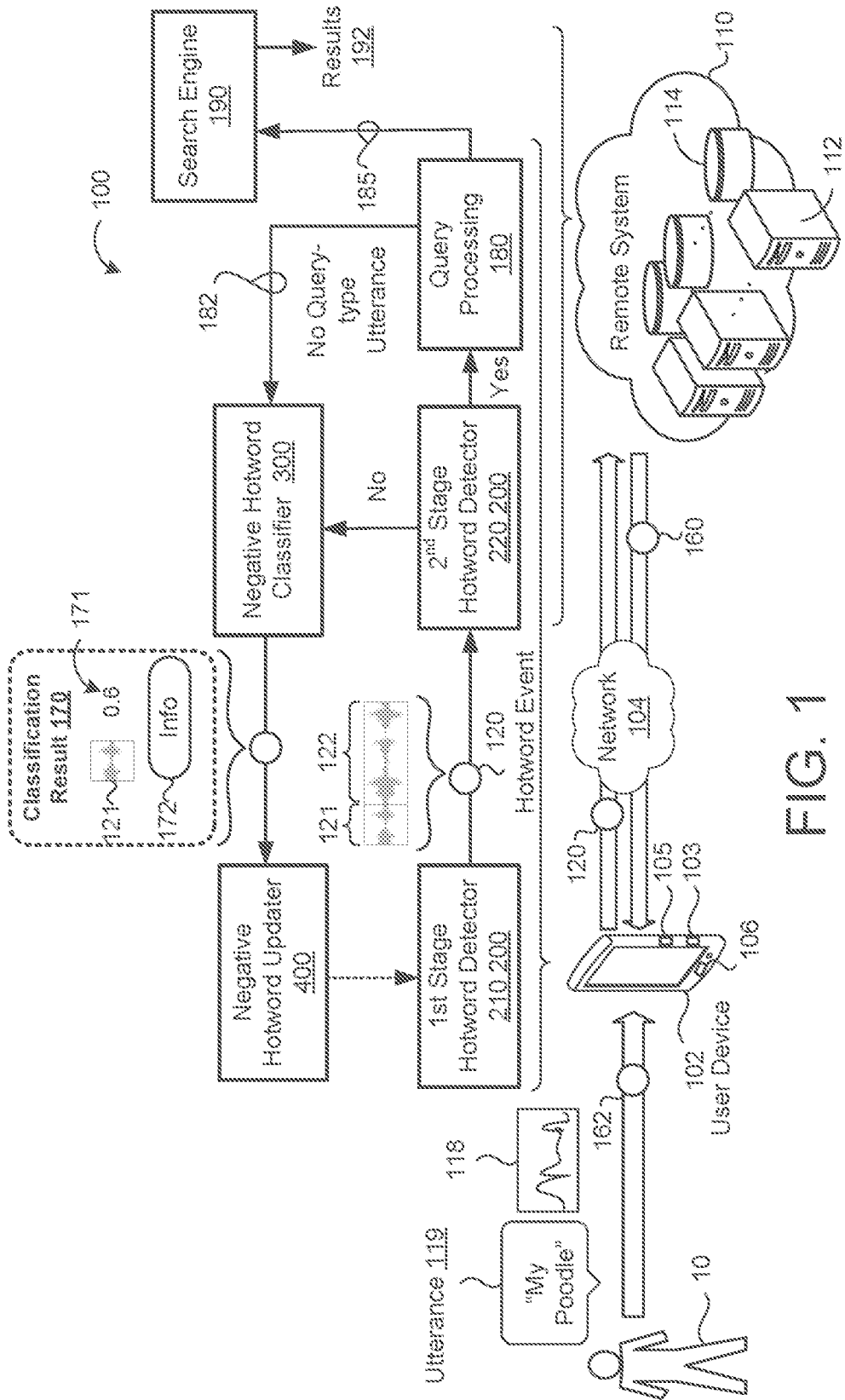
FIG. 1 is a schematic view of an example system for classifying negative hotwords and updating a first stage hotword detector to prevent detecting hotword events in audio containing negative hotwords.

Speech-based interfaces such as digital assistants are becoming increasingly prevalent across a variety of devices including without limitation, mobile phones and smart speakers/displays that include microphones for capturing speech. The general way of initiating voice interaction with a speech-enabled device is to speak a fixed phrase, e.g., a hotword, that when detected by the speech-enabled device in streaming audio, triggers the speech-enabled device to initiate a wake-up process to begin recording and processing subsequent speech to ascertain a query spoken by the user. Thus, as a primary entry point for a speech-based interface, it is critical that hotword detection/recognition works reliably both in terms of recall, and also precision, so that a number of false wake-up events is minimized.

A false negative (also referred to as 'false rejection') refers to not detecting a hotword spoken in streaming audio that was spoken by the user when intending to interact with the speech-based interface (e.g., digital assistant). Here, the speech-enabled device fails to react to the user and requires the user to attempt to invoke the interface again by speaking the hotword again, often louder and with different enunciation, to ensure that the hotword is detected. On the other hand, a false positive (also referred to as 'false acceptance') refers to detecting a hotword in streaming audio when the streaming audio did not actually contain the hotword, generally due to the streaming audio containing a word/phrase that, when spoken, sounds phonetically similar to the hotword. The false positive causes the speech-enabled device to initiate the wake-up process even though the user did not intend to invoke the system, thereby surprising and/or confusing the user by reacting when the speech-enabled device should have remained in a sleep state.

A cascade hotword detection architecture incorporates a first stage hotword detector that runs on device to detect the presence of a hotword in streaming, and a second stage hotword detector that confirms the presence of the hotword detected by the first stage hotword detector. The second stage hotword detector is associated with higher accuracy in detecting the presence of hotwords in streaming audio, and thus, includes higher power requirements than the first stage hotword detector. Often, the second stage hotword detector is implemented on a server in communication with the first stage hotword detector implemented on the speech-enabled device. Even during a partial false positive, where the first stage hotword detector detects the presence of a hotword locally but the second stage hotword detector implemented at the server rejects the presence of the hotword, has a negative effect on user experience even though the server ultimately suppresses the wake-up process. That is, the detection of the hotword by the first stage hotword detector still causes the device to wake-up and connect to the server which is noticeable to the user (e.g., visible notification or flashing light) and is further undesirable from the privacy and power-preserving perspectives. Accordingly, eliminating the occurrence of partial false positive instances is desirable to improve user experience.

Conventionally, speech-enabled devices all use a same, fixed hotword model for all users of a given language (or locale) that is updated periodically with new versions pushed from server to device. That is, the same hotword model is used to detect hotwords in streaming audio for all users despite the existence of huge variations across user speech, accents, vocabulary, and/or acoustic environments in which the speech-enabled devices are operating. As a result, it is nearly impossible to implement stringent precision/recall requirements for detecting hotwords when a single hotword model is shared across all users of a given language/locale.

For a given user and/or environment, hotword false positive instances are very likely to cluster together. In a non-limiting example, a particular user speaking the term "poodle" may cause a hotword detection model on a speech-enabled device to incorrectly detect the presence of the designated hotword "Hey Google", whereas a different user may cause the same hotword detection model implemented on another speech-enabled device to detect the designated hotword when that user speaks "doodle". The variation in these false positive instances across different users can be attributed to pronunciation differences of the users and/or frequency of those terms in the respective vocabularies of those users. Since the same false positive instances are likely to reoccur based on similar acoustic patterns for a same user in a same environment, a hotword detector should ideally learn to adapt to avoid repeating the same false positives over and over when the user speaks a given with a pronunciation similar to the designated hotword.

Implementations herein are directed toward personalizing a hotword detector on a speech-enabled device of a user based on specific terms classified as negative hotwords which caused previous instances of hotword detection false positives. A specific term classified as a negative hotword may be user-specific such that any hotword detection is suppressed when an audio segment derived from a particular user speaking the term is detected by the hotword detector. Additionally or alternatively, a specific term classified as a negative hotword may be device-specific such that hotword detection is suppressed when the audio segment derived from users speaking the term is detected by the hotword detector implemented on a particular device but not on other speech-enabled devices associated with the same user(s). This follows the notion that devices located in some environments may be more prone to hotword detection false positives than devices located in other environments due to acoustic variation, variation in vocabulary, and variation across users who typically speak in the environments.

Referring to FIG. 1, in some implementations, an example system 100 includes a user device 102 associated with one or more users 10 and in communication with a remote system 110 via a network 104. The user device 102 may correspond to a computing device, such as a mobile phone, computer (laptop or desktop), tablet, smart speaker/display, smart appliance, smart headphones, wearable, vehicle infotainment system, etc., and is equipped with data processing hardware 103 and memory hardware 105. The user device 102 includes or is in communication with one or more microphones 106 for capturing utterances from the respective user 10. The remote system 110 may be a single computer, multiple computers, or a distributed system (e.g., a cloud environment) having scalable/elastic computing resources 112 (e.g., data processing hardware) and/or storage resources 114 (e.g., memory hardware).

The user device 102 includes a first stage hotword detector 210 (also referred to as a hotword detection model) configured to detect the presence of a hotword in streaming audio 118 without performing semantic analysis or speech recognition processing on the streaming audio 118. In some implementations, user device 102 also includes an initial coarse hotword detector 205 (FIG. 2) that is trained to initially detect the presence of the hotword before invoking the first stage (fine) hotword detector 210 to receive the streaming audio 118 and confirm whether or not the hotword is detected in the streaming audio 118. In some implementations, the first stage hotword detector 210 includes a trained neural network (e.g., a memorialized neural network) received from the remote system 110 via the network 104. The remote system 110 may push updates or new version of the first stage hotword detector 210 to a population of user devices 102 of a given local and/or associated with users of a specific language. That is, all user devices 102 associated with United States-English speaking users receive the same first stage hotword detector 210, which may include a neural network trained to detect the presence of the hotword in streaming audio 118 when spoken by English speaking users in the United States.

In some examples, the first stage hotword detector 210 executing on the user device 102 is configured to detect a presence of the hotword "Hey Google" in the streaming audio 118 to initiate a wake-up process on the user device 102 for processing the hotword and/or one or more other terms (e.g., query or command) following the hotword in the streaming audio 118. The first stage hotword detector 210 may be configured to generate a probability score that indicates a presence of the hotword in audio features of the streaming audio 118 captured by the user device 102, and detect the hotword in the streaming audio 118 when the probability score satisfies a hotword detection threshold of the first stage hotword detector 210. Accordingly, the first stage hotword detector 210 may detect a hotword event in streaming audio 118 captured by the user device 102 when a probability score generated for audio features of the streaming audio 118 satisfy the hotword detection threshold.

In the example shown, the user 10 speaks an utterance 119 that includes a term/phrase (e.g., "Hey Poodle") captured as streaming audio 118 by the user device 102 that has a similar pronunciation as a fixed term/phrase (e.g., "Hey Google") designated as the hotword the first stage hotword detector 210 is trained to detect. Notably, the user 10 may pronounce the term "Hey Poodle" such that it is more difficult for the first stage hotword detector to distinguish from the designated hotword "Hey Google" than it would be when spoken by other users that use a slightly different pronunciation. As a result, the first stage hotword detector 210 executing on the user device 102 falsely detects the presence of the hotword by generating a probability score for audio features associated with "Hey Poodle" that satisfies the hotword detection threshold, thereby triggering initiation of a wake-up process that was not intended by the user 10.

When the probability score for the audio features associated with "Hey Poodle" satisfy the hotword detection threshold, the first stage hotword detector 210 further transmits audio data 120 characterizing the hotword event to a second stage hotword detector 220 executing on the remote system 110. In some examples, the audio data 120 is a direct representation of the streaming audio 118, while in other examples, the audio data 136 represents the streaming audio 118 after processing by the first stage hotword detector 210 (e.g., to identify and/or isolate specific audio characteristics of the streaming audio 118 or to convert the streaming audio 118 to a format suitable for transmission and/or processing by the second stage hotword detector 220). For instance, the audio data 120 includes a first segment 121 chomped from the streaming audio 120 that includes the relevant audio features associated with the presence of the hotword detected by the first stage hotword detector 210. The audio data 120 also includes a second segment 122 that, includes audio features captured by the user device 102 in the streaming audio 118 that follow the first segment 121. Typically, the first segment 121 is generally of a fixed duration sufficient for containing audio features associated with the designated hotword. The second segment 122, however, may have a variable duration containing audio captured by the user device 102 while the microphone 106 is open. The second segment 122 may capture a query-type utterance that requires further processing (e.g., automated speech recognition and/or semantic interpretation) on one or more terms to identify a query or command in the audio data. In the example scenario, since the first segment 121 includes audio features captured by the user device that are not associated with the user speaking the hotword, but are rather associated with another term/phrase that the user 10 pronounces similar to the hotword, the user 10 did not intend to invoke the device 102 through speech, and therefore, the second segment 122 is likely not to include a query-type utterance, but instead include background noise captured in the streaming audio 118 from the environment of the user device 102.

The first stage hotword detector 210 and the second stage hotword detector 220 cooperate to form a cascade hotword detection architecture 200 whereby the second stage hotword detector 220 is configured to confirm whether or not a hotword detected by the first stage hotword detector 210 is present the audio data 120. Specifically, the second stage hotword detector 220 executing on the remote system 110 processes the audio data 120 to determine whether a hotword is detected by the second stage hotword detector in the first segment 121 of the audio data 120. In some examples, the second stage hotword detector 210 is implemented as an automated speech recognition (ASR) engine that performs speech recognition on the first segment 121 of the audio data 120 to determine whether the hotword is present. The second stage hotword detector 210 may detect the presence of the hotword in the first segment 121 when a probability of recognizing the hotword satisfies a hotword detection threshold.

In other examples, the second stage hotword detector 220 is similar to the first stage hotword detector 210 in that the second stage hotword detector 220 is a model implemented as a trained neural network configured to detect the presence of the hotword in the first audio segment 121 without performing semantic analysis or speech recognition processing. In these examples, the second stage hotword detector 220 may be associated with a larger version of the hotword detection model used by the first stage hotword detector 210 and include a different neural network that is potentially more computationally-intensive than the neural network of the first stage hotword detector 210, thereby offering an increased hotword detection accuracy over the first stage hotword detector 210, which is limited by resources of the user device 102. The second stage hotword detector 220 may generate a probability score indicating the presence of the hotword in the first segment of audio data 120 and detect the presence of the hotword when the probability score satisfies a hotword detection threshold of the second stage hotword detector 220. Here, a value of the hotword detection threshold at the second stage hotword detector 220 may be the same or different than a value of the hotword detection threshold at the first stage hotword detector 210. In some examples, the value of the hotword detection threshold at the second stage hotword detector 220 is set higher to require the second stage hotword detector 220 to be more confident when determining whether or not a hotword is present in the first audio segment 121.

In some implementations, the second stage hotword detector 220 executes on the user device 102 (e.g., the data processing hardware 103) to implement the entire cascade hotword detection architecture 200 on-device without the use of the remote system 110. The second stage hotword detector 220 when executing on the user device 102 can be implemented as an on-device ASR engine to detect the presence of the hotword by performing speech recognition on the first audio segment 121 or as a larger version of the hotword detection model implemented by the first stage hotword detector 210 to detect the presence of the hotword in the first audio segment 121 without performing speech recognition.

Figure 2:
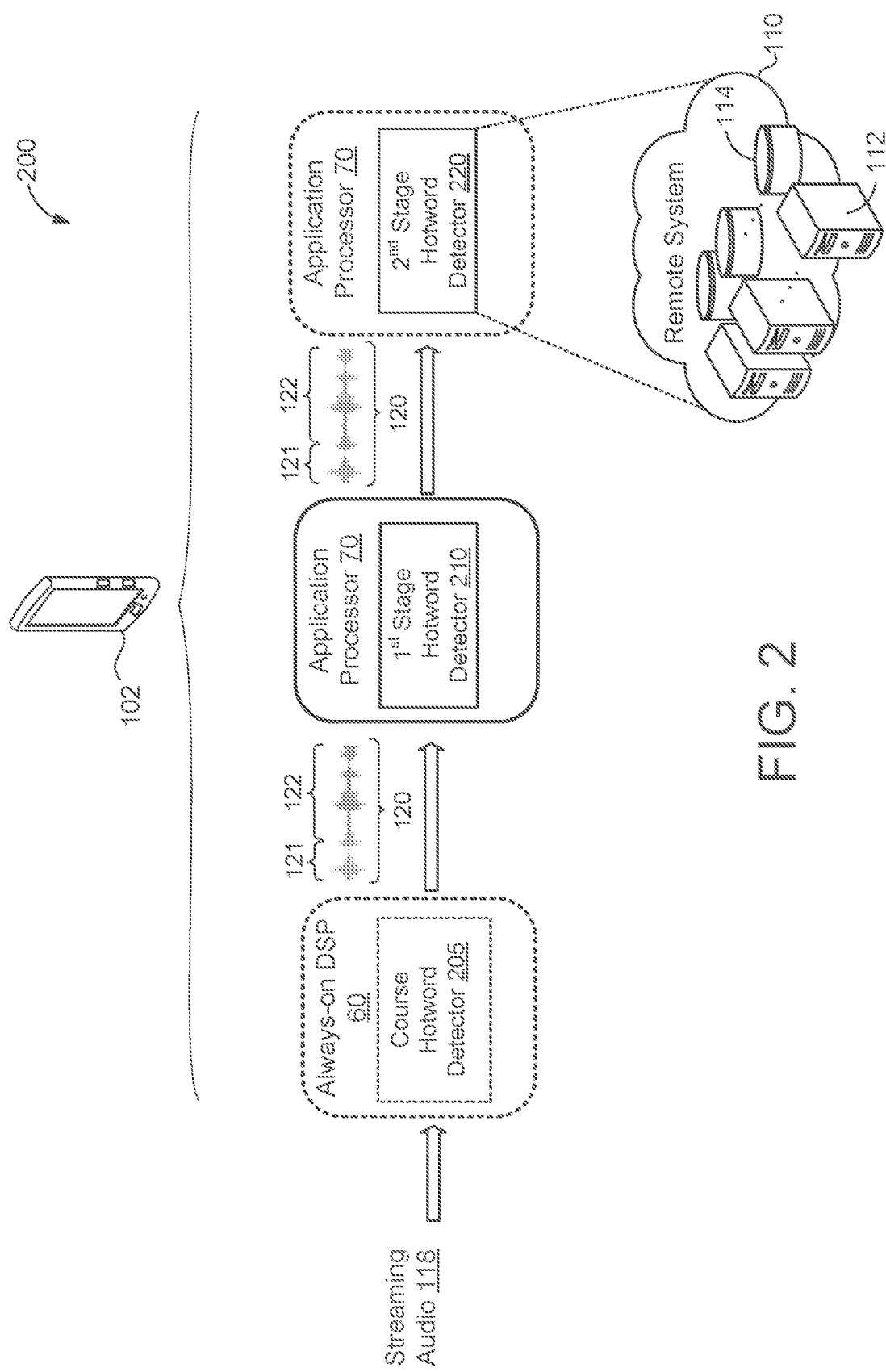
FIG. 2 is a schematic view of a hotword detection architecture.

FIG. 2 provides an example of the cascade hotword detection architecture 200 of FIG. 1 including the first stage hotword detector 210, the second stage hotword detector 220, and optionally the initial coarse hotword detector 205. In some examples, when the user device 102 is a battery-powered device, the data processing hardware 103 of the user device 102 collectively includes a first processor 60 (e.g., digital signal processor (DSP)) and a second processor 70 (e.g., application processor (AP)). The first processor 60 consumes less power while operating than the second processor 70 consumes while operating. As used herein, the first processor 60 may be interchangeably referred to as a DSP and the second processor 70 may be interchangeably referred to as an "AP" or a "device SoC". The initial coarse hotword detector 205 may run on the first processor 60 and the first stage hotword detector 210 may run on the second processor 70. The second stage hotword detector 220 may execute on a server (e.g., remote system 110) in communication with the user device 102 to provide server-side hotword confirmation that leverages increased processing capabilities at the server. Alternatively, the second stage hotword detector 220 may run on the second processor 70 of the user device 102 to implement the entire cascade hotword detection architecture on-device.

Generally, the coarse hotword detector 205 resides on a specialized DSP 60, includes a smaller model size than a model associated with the first stage hotword detector 210, and is computationally efficient for coarsely screening input streaming audio 118 for hotword detection. Accordingly, the specialized DSP 60 e.g., first processor) may be "always-on" so that the coarse hotword detector 205 is always running to coarsely screen for hotword candidates in multi-channel audio 118, while all other components of the user device 102, including the main AP 70 (e.g., second processor), are in a sleep state/mode to conserve battery life. On the other hand, the first stage hotword detector 210 resides on the main AP 70, includes a larger model size and provides more computational output than the coarse stage hotword detector 205 for providing a more accurate detection of the hotword that was initially detected by the coarse hotword detector 205. Thus, the first stage hotword detector 210 may be more stringent in determining whether or not the hotword is present in the audio 118. While the DSP 60 is "always-on", the more power consuming main AP 70 operates in a sleep mode to reserve battery-life until the coarse hotword detector 205 at the DSP 60 detects the candidate hotword in the streaming audio 118. Thus, only once the candidate hotword is detected, does the DSP 60 trigger the main AP 70 to transition from the sleep mode and into a hotword detection mode for running the first stage hotword detector 210.

Upon receiving the streaming audio 118, the always-on DSP 60 executes/runs the coarse hotword detector 205 for determining whether a hotword is detected in the respective audio features of the streaming audio 118. Notably, the AP 70 may operate in the sleep mode when the multi-channel audio is received at the DSP 60 and while the DSP 60 processes the respective audio features of the streaming audio 118.

When the coarse hotword detector 205 detects the hotword in the streaming audio 118, the DSP 60 provides chomped audio data 120 to the AP 70. In some examples, the DSP 60 providing the chomped audio data 120 to the AP 70 triggers/invokes the AP 70 to transition from the sleep mode to the hotword detection mode. In some implementations, the audio data 120 chomped from the streaming audio 118 includes a first segment 121 characterizing the hotword detected by the coarse hotword detector 205 in the streaming audio 118. That is, the first includes a duration sufficient to safely contain the detected hotword. Additionally, audio data 212 includes a second segment 122 following the first segment 121 that may include a duration of audio containing a spoken query. The coarse hotword detector 205 is optional and the first stage hotword detector 210 may initially detect the hotword event in the streaming audio 118, chomp the audio data 120 including the first and second segments 121, 122, and provide the chomped audio data 120 to the second stage hotword detector 220.

When the hotword is detected by the first stage hotword detector 210 in the first segment 121 of the audio data 120, the AP 70 initiates a wake-up process on the user device 102 and provides the audio data 120 to the second stage hotword detector 220 for processing to determine/confirm whether the hotword is detected by the second stage hotword detector 220 in the first segment 121 of the audio data 120. In examples where the cascade hotword detection architecture 200 is implemented entirely on-device, the AP 70 simply passes the audio data 120 to the second stage hotword detector 220 also running on the AP 70. In other examples, where the second stage hotword detector 220 is implemented at a server 110, the AP 70 instructs the user device 102 to transmit the audio data 120 via a network 104 to the second stage hotword detector 220.

Referring back to FIG. 1, in some examples, when the hotword is not detected by the second stage hotword detector 220 in the first segment 121 of the audio data 120 (i.e., the probability score satisfies the hotword detection threshold), a negative hotword classifier 300 executing on the remote system 110 classifies the first segment 121 of the audio data 120 as containing a negative hotword (e.g., Hey Poodle) that caused a false detection of the hotword event in the streaming audio 118 by the first stage hotword detector 210. In configurations when the second stage hotword detector 220 runs on the user device 102, the negative hotword classifier 300 may also execute on the user device 102. The negative hotword classifier 300 may provide a classification result 170 to a negative hotword updater 400 that indicates the classification of the first segment 121 of the audio data 120 as containing the negative hotword. The classification result 170 may provide the probability score 171 generated by the second stage hotword detector 220 for the first audio segment 121 and/or other pertinent information 172 associated with the corresponding classification result 170 that may be useful for the negative hotword updater 400 for updating the first stage hotword detector 210. The other pertinent information 172 may include, without limitation, a transcript of the utterance 119, a speaker identification score (e.g., a speaker embedding) identifying the speaker characteristics of the user 10 that spoke the utterance 119, a time stamp of the hotword event indicating the time of day and/or a day of the week, and a negative hot word confidence score 304 (FIG. 3) indicating a confidence for classifying the first segment 121 as the negative hotword. In the example shown, the negative hotword updater 400 executes on the user device 102 for personalizing hotword detection on the user device 102 by updating the first stage hotword detector 210 to prevent triggering the hotword event in subsequent audio data that contains the negative hotword.

Sending the classification result 170 to the negative hotword updater 400 may cause the negative hotword updater 400 to update the first stage hotword detector 210 to prevent triggering the hotword event in subsequent audio data that contains the negative hotword (e.g., Hey Poodle). In some implementations, when the hotword is not detected by the second stage hotword detector 220 in the first segment 121 of the audio data 120, the remote system 110 (or the user device 102) suppresses a wake-up process on the user device 102 for processing the hotword and/or one or more other terms following the hotword in the streaming audio 118. In some implementations, the remote system 110 suppresses the wake-up process by sending suppression instructions 160 to the user device 102 that causes the user device 102 to suppress the wake-up process. In other implementations, the providing of the classification result 170 indicating that the first segment 121 of the audio data 120 contains the negative hotword causes the user device 102 to suppress the wake-up process. In yet other implementations, the remote system 110 suppresses the wake-up process by not responding to the user device 102 (e.g., by closing the network connection) after receiving the audio data 120. A lack of response from the remote system 110 may cause the user device 102 to suppress the wake-up process. That is, the user device 102, in some examples, only initiates the wake-up process upon receiving confirmation from the second stage hotword detector 220 that the hotword was present in the streaming audio 118. The user device 102 may independently suppress the wake-up process. For example, when the query or command following the hotword is empty, the user device 102 may automatically suppress the wake-up process (i.e., the streaming audio 118 following the hotword fails to include a command or query directed at the user device 102).

In some scenarios, after suppressing the wake-up process due to the second stage hotword detector 220 not detecting the presence of the hotword in the first segment 121 of the audio data 120, the negative hotword classifier 300 determines whether an immediate follow-up query was provided by the user 10 of the user device 102. This determination may be made when no subsequent hotword event detected by the first stage hotword detector 210 is received by the second stage hotword detector 220. Here, a determination that the user 10 did not provide an immediate follow-up query serves as additional confirmation that the user 10 did not previously intend to speak the hotword in the utterance 119, but rather spoke a term ("Hey Poodle") with a similar pronunciation to the particular term/phrase ("Hey Google") designated as the hotword. Accordingly, classifying the first segment 121 of the audio data 120 as containing the negative hotword may be further based on a determination that no follow-up query was received from the user device 102 after suppressing the wake-up process.

In additional examples, when the second stage hotword detector 220 detects the presence of the hotword ("Hey Google") in first segment 121 of the audio data 120 (i.e., the probability score satisfies the hotword detection threshold) despite the user 10 really speaking another similarly sounding phrase ("Hey Poodle"), the second segment 122 (and optionally the first segment 121) of the audio data 120 are provided to the query processor 180. Here, the query processor 180 processes the second segment 122 of the audio data 120 to determine whether the second segment 122 of the audio data 120 is indicative of a spoken query-type utterance. In examples when the second stage hotword detector 220 is implemented as an ASR engine, the query processor 180 process the resulting speech recognition result by performing semantic analysis to determine if the second segment 122 is indicative of the query-type utterance. In other examples, when the second stage hotword detector 220 is implemented as a hotword detection model, the query processor 180 is implemented as the ASR engine that processes the second segment 122 of the audio data 120 by performing speech recognition and then performing semantic analysis on the speech recognition result. As used herein, a query-type utterance corresponds to an utterance that was directed to the user device 102, e.g., an utterance directed to a digital assistant interface for querying the digital assistant to perform an operation or action. Thus, when the second segment 122 of the audio data 120 is indicative of the query-type utterance, there is a strong likelihood that the second stage hotword detector 220 was accurate in detecting the presence of the hot word in the first segment 121 of the audio data 120. Otherwise, when the query processor 180 determines that the second segment 122 is not indicative of the query-type utterance, there exists a strong likelihood that the second stage hotword detector 220 was incorrect in detecting the presence of the hotword in the first segment 121.

The query processor 180 may provide a score 182 indicating whether or not the second segment 122 is indicative of a query-type utterance. In some examples, the score 182 is binary where the score 182 of zero or one (1) indicates the query-type utterance and the score of the other one of zero or one (1) does not indicate the query-type utterance. In other examples, the score 182 provides a likelihood (e.g., probability) that the second segment 122 is indicative of a query-type utterance. Here, when the score 182 fails to satisfy a query-type utterance threshold the second segment 122 may not be indicative of the query-type utterance. In the example shown, the negative hotword classifier 300 may receive the score 182 as an input in addition to the determination made by the second stage hotword detector 220 for determining whether or not the first segment 121 of the audio data 120 should be classified as containing the negative hotword.

Thus, when the negative hotword classifier 300 receives an indication from the query processor 180 that the second audio segment 122 of the audio data is not indicative of the spoken query-type utterance, the negative hotword classifier 300 may classify the first segment 121 of the audio data 120 as containing the negative hotword to indicate that the second stage hotword detection 220 provided a false acceptance. The negative hotword classifier 300 may additionally receive the probability score 171 generated by the second stage hotword detector 220 for the first segment 121, whereby a probability score only satisfying the hotword detection threshold by a narrow margin may further bias the negative hotword classifier 300 to classify the first segment 121 as containing the negative hot word. Moreover, after the query processor 180 determines that the second segment 122 is not indicative of the query-type utterance, the negative hotword classifier 300 may also determine whether an immediate follow-up query was provided by the user 10 of the user device. As discussed above, a determination that the user 10 did not provide an immediate follow-up query serves as additional confirmation that the user 10 did not previously intend to speak the hotword in the utterance 119, but rather spoke a term ("Hey Poodle") with a similar pronunciation to the particular term/phrase ("Hey Google") designated as the hotword. Accordingly, classifying the first segment 121 of the audio data 120 as containing the negative hotword may be further based on the determination that no follow-up query was received from the user device 102.

In some examples, after receiving the audio data 120 characterizing the hotword event detected by the first stage hotword detector 210, the remote system 110 receives a negative user interaction 162 indicating user suppression of a wake-up process on the user device 102. That is, the false acceptance instance by the first stage hotword detector 210 in detecting the hotword event when the user spoke the negative hotword "Hey Poodle" may trigger the user device 102 to initially wake-up while waiting for the second stage hotword detector 220 to confirm or reject the presence of the hotword. Here, the user device 102 may provide an audible and/or visual notification to inform the user that the user device 102 is awake and the user 10 may provide a negative user interaction 162 to revert the device 102 back to the sleep state since the user 10 did not intend to trigger the wake-up process. For instance, the user 10 may press a physical button on the user device, provide a gesture, or, when the user device 102 includes a display, select a graphic rendered in a graphical user interface displayed on the display that causes the user device 102 to revert back to the sleep state. In some implementations, the negative hotword classifier 300 uses the negative user interaction 162 indicating user suppression of the wake-up process on the user device as an input for classifying the first segment 121 of the audio data 120 as containing the negative hotword.

In some additional examples, when the query processor 180 determines that the second segment 122 of the audio data 120 is indicative of the spoken query-type utterance, the query processor 180 provides a query 185 to a search engine 190 (or other downstream application) that contains a transcription of the second segment 122 of the audio data 120. Here, the search engine 190 provides results 192 responsive to the query 185 back to the user device 102. Here, the query processor 180 may have identified the second segment 122 as being indicative of a query-type utterance even though the second segment 122 of the audio data 120 corresponded to background speech or other background audio that was captured by the user device 102 in streaming audio 118 after the first stage hotword detector 210 detected the false positive hot word event when the user spoke "Hey Poodle". This background audio may be captured in the streaming audio 118 and the query processor 180 may identify a query-type utterance and provide a corresponding query 185 to the search engine 190 to obtain a result 192. The result 192 may be audibly and/or visually output by the user device 102 to the user 10 even though the user 10 never intended to invoke the user device 102. As a result, the user 10 may provide the negative user interaction 162 indicating that the user 10 negatively interacted with the results 192. For instance, the user 10 may provide a spoken input indicating the user 10 is confused with the results or a statement that the user 10 did not provide a query. Additionally or alternatively, the user 10 may provide an input indication indicating an instruction/command to dismiss the results 192.

In other scenarios, the result 192 is a prompt from the digital assistant stating for audible output from the device 102 that the user 10 needs to provide confirmation for performing an action, e.g., "You asked for the current weather, is that correct?", whereby the negative user interaction can be the user 10 speaking "No, I did not ask about the weather". Similarly, the result 192 can be a prompt requesting the user to repeat a query because the query processor 180 was not confident in the query, e.g., "I did not understand your question, please repeat?", whereby the negative user interaction can be the user 10 expressing confusion by uttering "Huh", the user 10 affirmatively dismissing the prompt by speaking "I did not ask anything", or simply the user not responding within a predetermined period of time. Thus, the negative user interaction 162 may be provided to the negative hotword classifier 300 in addition to one or more of the other inputs discussed above such as an indication that the hotword was not detected by the second stage hotword detector 220 in the first segment of the audio data 120, an indication that the second segment 122 of the audio data 120 is not associated with a query-type utterance, or an indication that the user 10 did provide an immediate follow-up query after the wake-up process was suppressed.

Figure 3:
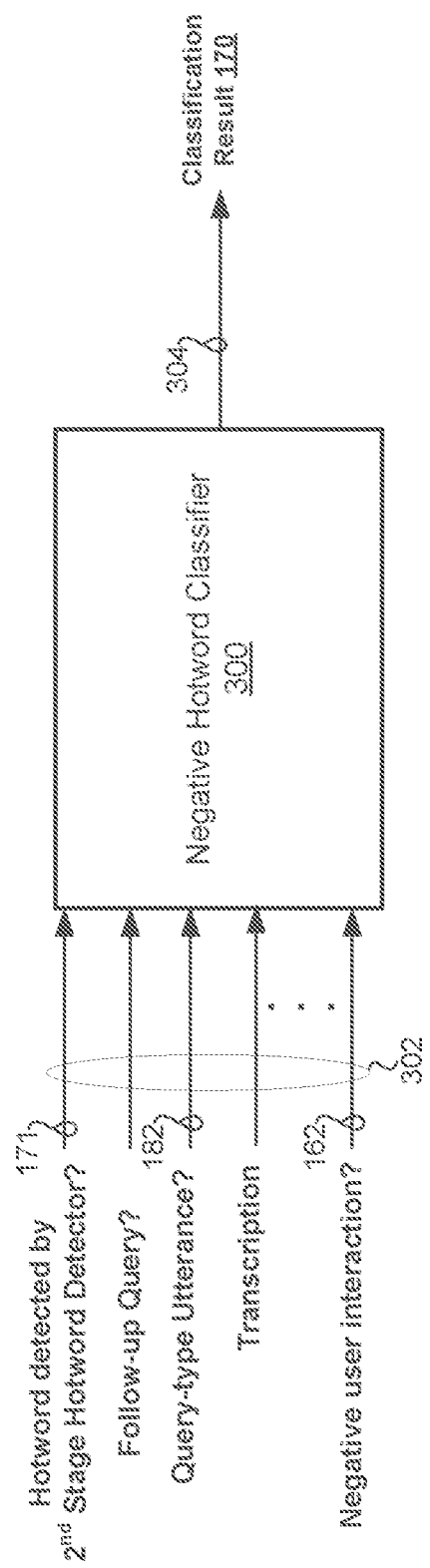
FIG. 3 is a schematic view of an example negative hotword classifier of the system of FIG. 1.

FIG. 3 shows an example of the negative hotword classifier 300 of FIG. 1 receiving one or more input features 302 for making the determination of whether or not a first segment 121 of audio data 120 should be classified as a negative hotword. When the negative hotword classifier 300 determines that the first segment 121 of the audio should be classified as the negative hotword based on the one or more input features 302, the negative hotword classifier 300 will generate the classification results 170 indicating classification of the first segment 121 of audio data 120 as the negative hotword as discussed above in FIG. 1. The one or more input features 302 received by the negative hotword classifier 300 may include, without limitation, whether or not the second hotword detector 220 detected the presence of the hotword in the first segment 121 of audio data 120 and/or the probability score 171, whether an immediate follow-up query was received from the user device 102, whether or not the second segment 122 of the audio data 120 is provided an indication a score 182 indicating whether or not the second segment 122 includes a query-type utterance (e.g., by providing the score 182 indicating whether or not the second segment 122 is indicative of a query-type utterance), a transcription of the first segment 121 and/or the second segment 122 of audio data 120, and whether or not a negative user interaction 162 is received indicating user suppression of a wake-up process on the user device 102 and/or that the user 10 negatively interacted with results 192 responsive to processing the second segment 122 (and/or optionally the first segment 121) of the audio data 120 as a query-type utterance (e.g., providing the query 185 to the search engine 190 or other downstream application).

Some input features 302 may be weighted more heavily when determining whether the first segment 121 of the audio data 120 should be classified as the negative hotword. For instance, the second stage hotword detector 220 failing to detect the presence of the hotword in the first segment 121 is a strong indication that the first segment 121 includes a negative hotword that caused the false acceptance instance at the first stage hotword detector 210. The magnitude of the probability score 171 may bias the classification result 170. For instance, the probability score 171 fading to satisfy the hotword detection threshold at the second stage hotword detector 220 by a wide margin provides a greater likelihood of a negative hotword than if the probability score 171 missed satisfying the hotword detection threshold by small margin.

In some configurations, the negative hotword classifier 300 includes a trained classifier (which may include a neural network model trained via machine learning) configured to generate a negative hotword confidence score 304 indicating a likelihood that the first segment 121 of the audio data 120 includes a negative hotword. The classifier 300 may classify the first segment 121 as containing the negative hotword when the negative hotword confidence score 304 satisfies a confidence threshold. The negative hotword confidence score 304 may be included in the classification results 170 received by the negative hotword updater 400 of FIG. 1 for use in updating the first stage hotword detector 210 to not detect the hotword event in subsequent audio containing the negative hotword. In some examples, the negative hotword confidence score 304 is a binary score indicating that the first segment 121 of audio data 120 includes the negative hotword, and thus should be classified as the negative hotword, or that the first segment 121 does not include the negative hotword.

Figure 4:
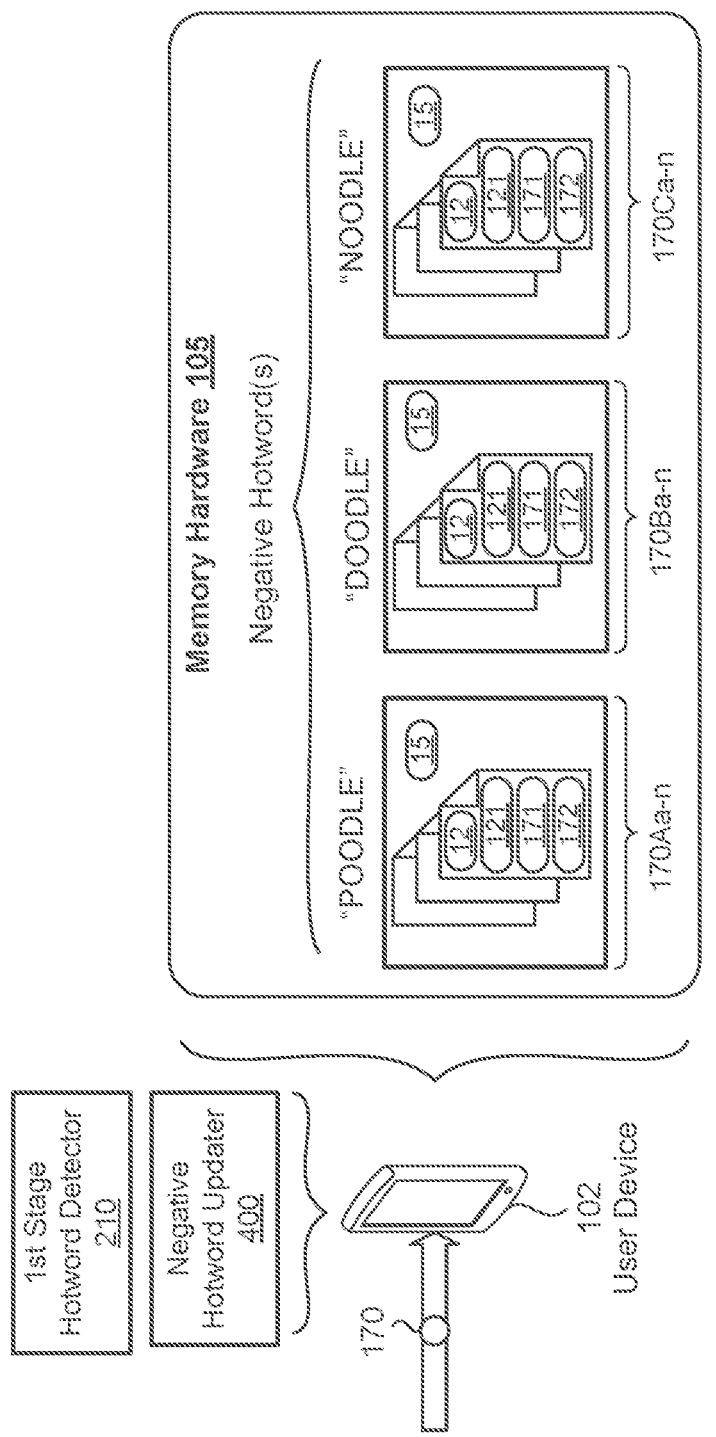
FIG. 4 is a schematic view of a user device storing classification results for audio data classified as containing a negative hotword.

Referring to FIGS. 1 and 4, in some examples, the negative hotword updater 400 updates the first stage hotword detector 210 to prevent triggering the hotword event in subsequent audio data that includes a negative hotword by providing the classification result 170 that includes the first segment 121 of the audio data 120 to the user device 102. Here, the user device 102 may be configured to retain the first stage hotword detector 210 using the first segment 121 of the audio data 120 classified as containing the negative hotword. For example, the first segment 121 of audio data 120 may be labeled as a negative hotword and provided as a training input to the first stage hotword detector 210 so the first stage hotword detector 210 learns to not detect the presence of the hotword ("Hey Google") in subsequent audio data containing the negative hotword ("Hey Poodle"). As used herein, retraining the first stage hotword detector 210 may include retraining an existing hotword detector 210 running on the user device 102 that initially detected the hotword event incorrectly or may include a new first stage hotword detector 210 pushed to the user device 102 at a later time.

Moreover, updating the first stage hotword detector 210 may also include updating the optional initial coarse hotword detector 205 running on a DSP 60 (FIG. 2) when the user device 102 includes a battery-powered device. As with the first stage hotword detector 210, updating the initial coarse hotword detector 205 may include retraining the initial coarse hotword detector 205 to prevent triggering hotword events for audio data including a negative hotword. In some examples, only the initial coarse hotword detector 205 is updated to prevent triggering the hotword event in subsequent audio data that includes a negative hotword.

As shown in FIG. 4, the negative hotword updater 400 executes on the user device 102 store each instance of a first segment 121 of audio data 120 classified by the negative hotword classifier 300 as containing a corresponding negative hotword in the memory hardware 105. In the example shown, the user device 102 stores each instance where a first segment 121 of audio data 120 was classified as a negative hotword by storing the corresponding classification result 170 for each instance. Here, the classification result 170 includes the first segment 121 classified as containing the negative hotword, the probability score 171 indicating the likelihood that the first segment 121 included the actual hotword, and the other pertinent information 172, such as the transcript of the utterance 119, a speaker identification score (e.g., a speaker embedding) identifying the speaker characteristics of the user 10 that spoke the utterance 119, a time stamp of the hotword event indicating the time of day and/or a day of the week, and a negative hotword confidence score 304 (FIG. 3) indicating a confidence for classifying the first segment 121 as the negative hotword. In the example shown, the user device 102 stores one or more classification results 170 each associated with a different corresponding negative hotword. For instance, one more classification results 170Aa-n, 170Ba-n, 170Ca-n may be stored for each of the negative hotwords "Poodle", "Doodle", and "Noodle" that when spoken by the user 10, are pronounced similar to the designated hotword "Hey Google".

In some implementations, the user device 102 (via the negative hotword updater 400) is configured to retrain the first stage hotword detector 210 based on an aggregation of the number of instances (e.g., number of classification results 170) of the first segment 121 of the audio data 120 classified as containing the negative hotword stored in the memory hardware 105. Here, the number of instances of audio data classified as containing the same hotword satisfying a threshold number of instances may establish a pattern that the user 10 is regularly speaking the negative hotword falsely detected as the designated hotword by the first stage hotword detector 210. In some examples, the user device 102 requires a specified number of false acceptance instances resulting from the user 10 speaking the same term when the negative hotword confidence scores 304 associated with scores is relatively low, e.g., the negative hotword confidence scores 304 only satisfied the threshold by a narrow margin.

With continued reference to FIG. 4, in some examples, the negative hotword updater 400 may append an embedding representation 12 to each classification result 170 stored in the memory hardware 105. Here, the first stage hotword detector 210 may compute an embedding representation 12 for any audio data characterizing a hotword event detected by the first stage hotword detector 210, and when the audio data 120 is subsequently classified by the negative hotword classifier 300 as containing a negative hotword, the negative hotword updater 400 may append the embedding representation 12 to the corresponding instance of the classification result 170. In some implementations, the negative hotword updater 400 aggregates/averages the embedding representations 12 stored in the memory hardware 105 for each corresponding negative hotword to generate a reference embedding 15 for each corresponding negative hotword. For example, a corresponding reference embedding 15 may be generated for each of the negative hotword "Poodle", "Noodle", and "Doodle".

Figure 5:
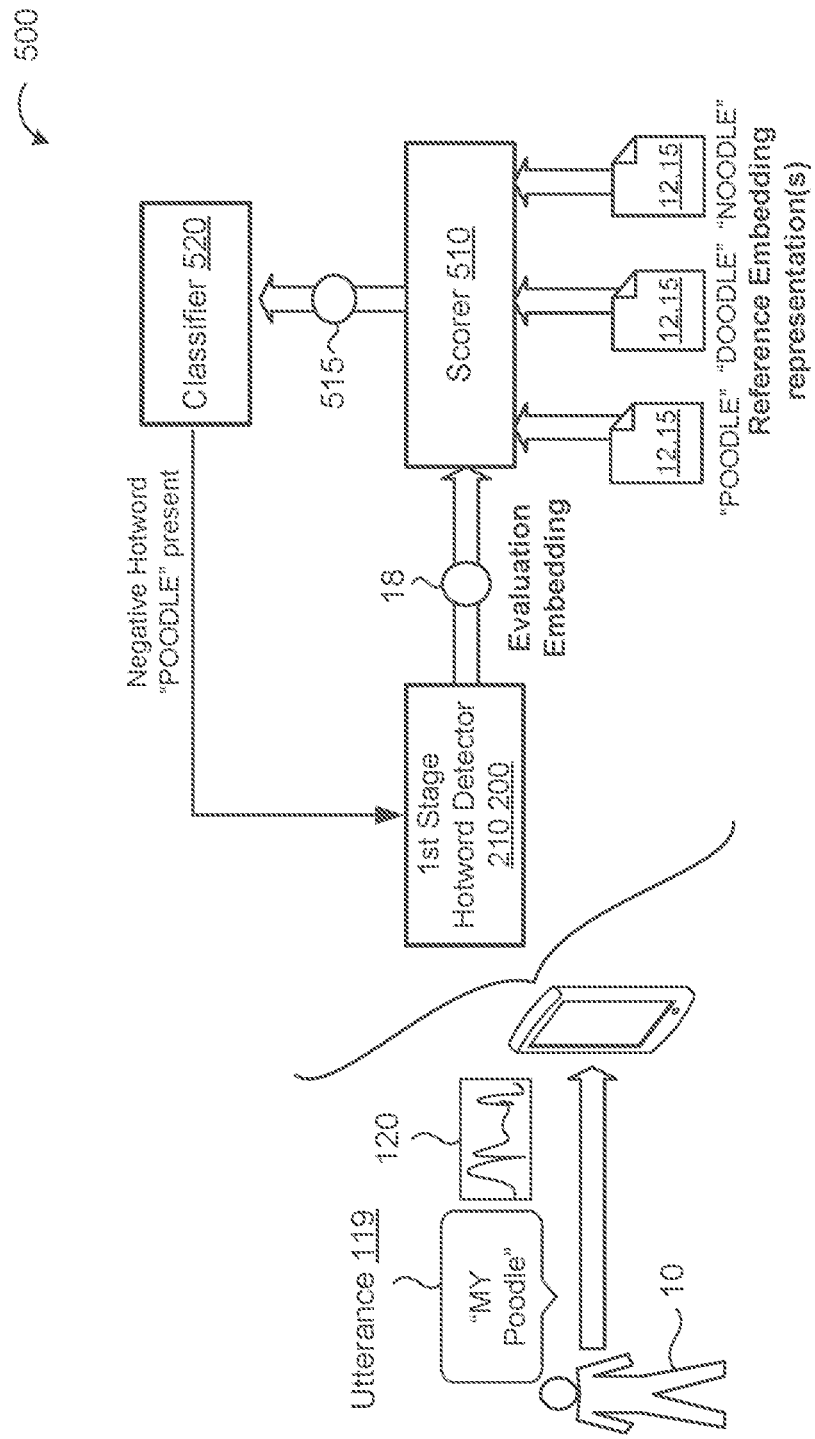
FIG. 5 is a schematic view of an example user device identifying the presence of a personal negative hotword in captured audio data to prevent triggering a hotword event in the audio data.

FIG. 5 shows a schematic view 500 depicting an example where user device 102 captures subsequent audio data 120 corresponding to another utterance 519 spoken by the user 10 that includes the term "My Poodle" and that causes the first stage hotword detector 210 to falsely detect another hotword event. The first stage hotword detector 210 executing on the user device 102 computes an evaluation embedding representation 18 for the subsequent audio data 120 (e.g., the portion of the subsequent audio data 120 characterizing the hotword event). The user device 102 may simultaneously access the classification result(s) 170 stored in the memory hardware 105 that may each include an embedding representation 12 of the corresponding first segment 121 of audio data 120 that was classified as one of the negative hotwords (e.g., "Poodle", "Noodle", and "Doodle"). Additionally or alternatively, the user device 102 may access a corresponding reference embedding 15 generated for each of the negative hotwords as described above with reference to FIG. 4.

In some implementations, a scorer 510 compares the evaluation embedding representation 18 computed for the subsequent audio data 120 with all of the reference embeddings 15 generated and stored for each of the negative hotwords. In these implementations, the reference embedding representations 12, 15 associated with each negative hotword "Poodle", "Doodle", and "Noodle" will all be clustered together in an embedding representation space distinct from the clusters of the reference embeddings associated with the other negative hotwords. Accordingly, the scorer 510 may determine a similarity score 515 between the reference embedding representation 12 computed for each first segment 121 of audio data 120 that was classified as any of the negative hotword and the evaluation embedding representation 18 for the subsequent audio data 120. Additionally or alternatively, the scorer 510 may determine a similarity score 515 between each corresponding reference embedding representation 15 that represents an aggregate/average embedding representation fora corresponding one of the negative hotwords (e.g., "Poodle", "Doodle", and "Noodle"). In some examples, each similarity score 515 is associated with a distance (e.g., a cosine distance) between the evaluation embedding representation 18 and the reference embedding representation 12, 15 in the embedding representation space.

After the scorer 510 determines/generates the similarity score(s) 515, a classifier 520 may compare each similarity score 515 to a similarity score threshold and determine/classify the subsequent audio data 120 as including the negative hotword when the similarity score 515 satisfies the similarity score threshold. In some examples, the similarity score threshold represents a maximum allowable cosine distance between embedding representations associated with a same negative hotword. In some scenarios, when a similarity score 515 is computed between the evaluation embedding 18 for the subsequent audio and a corresponding reference embedding representation 12 computed for each instance of a first segment 121 of audio data 120 being classified as a negative hotword, multiple similarity scores 515 may satisfy the similarity score threshold. To illustrate, in the example shown, the similarity scores 515 between the evaluation embedding 18 and the corresponding reference embedding representations 12 classified as the negative hotword "Poodle" will satisfy the similarity score threshold to indicate that the evaluation embedding 18 falls into a cluster of the embedding representations 12 classified as the negative hotword Poodle and outside the clusters of embedding representations 12 classified as the oilier negative hotwords "Doodle" and "Noodle". Thus, when the classifier 520 determines that the similarity score 515 satisfies the similarity threshold, the classifier 520 determines that the subsequent audio data 120 includes the negative hotword. As a result, the classifier 520 may instruct the first stage hotword detector 210 to suppress detecting the hotword event in the subsequent audio data or instructs the user device 102 to revert back to a sleep state if the first stage hotword detector 210 affirmatively falsely detected the hotword event and triggered initiation of a wake-up process on the user device.

Figure 6:
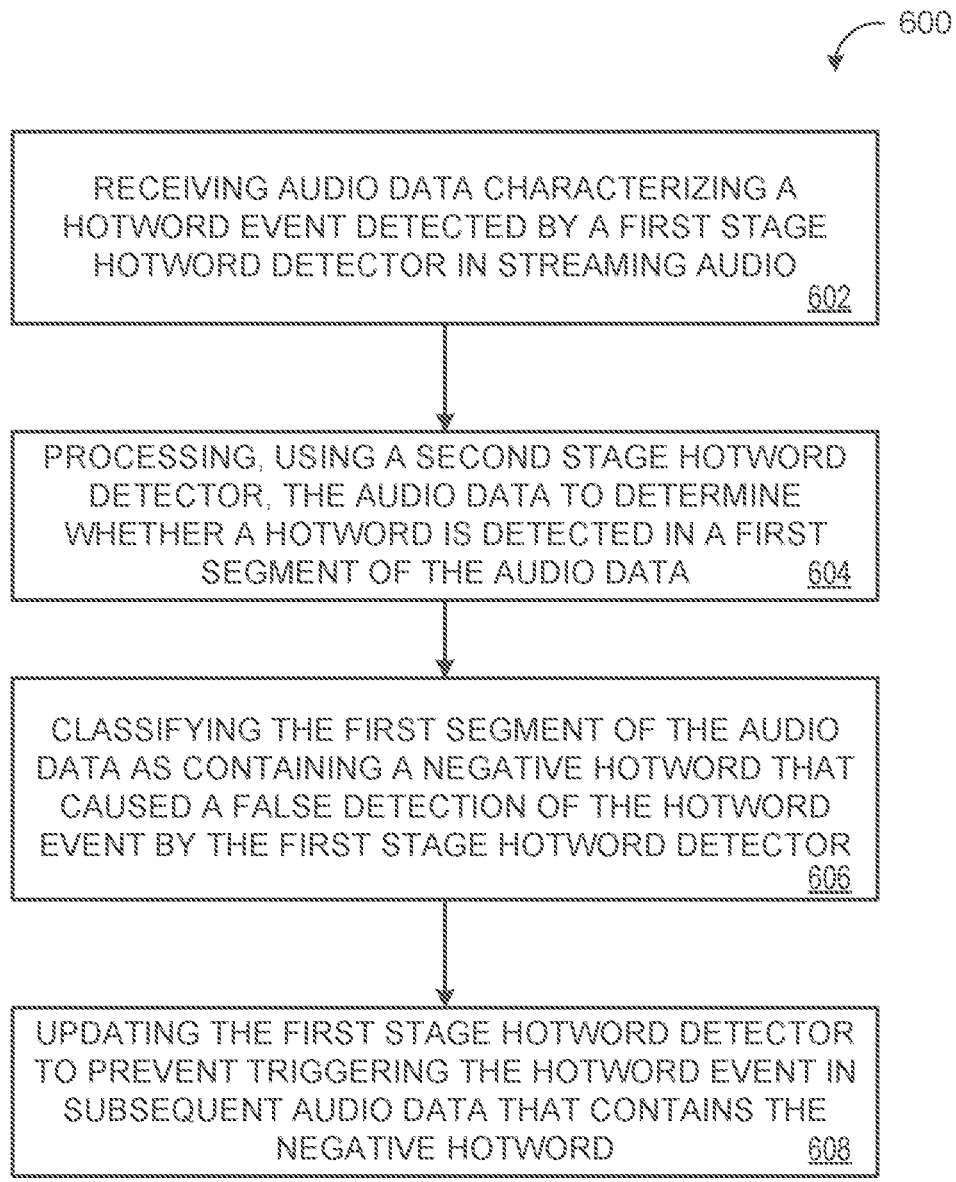
FIG. 6 is a flowchart of an example arrangement of operations for classifying personalized negative hotwords and updating a first stage hotword detector to prevent triggering a hotword event in audio data containing a personalized negative hotword.

FIG. 6 provides a flowchart of example operations for a method 600 of personalizing a hotword detector on a user device based on classifying specific terms as negative hotwords which caused previous instances of hotword detection false positive by the hotword detector. At operation 602, the method 600 includes receiving, at data processing hardware 103, 112, audio data 120 characterizing a hotword event detected by a first stage hotword detector 210 in streaming audio 118 captured by a user device 102. The first stage hotword detector 210 may execute on a digital signal processor (DSP) of the data processing hardware 103 of the user device 102 or execute on an application processor of the data processing hardware 103 of the user device 102.

At operation 604, the method 600 includes processing, by the data processing hardware 103, 112, using a second stage hotword detector 220, the audio data 120 to determine whether a hotword is detected by the second stage hotword detector 220 in a first segment 121 of the audio data 120. The second stage hotword detector 220 may be implemented as an ASR engine that performs automate speech recognition to determine whether the hotword is recognized in the first segment 121. The second stage hotword detector 220 may be implemented as a hotword detection model in other configurations, whereby the hotword detection model determines whether or not the hotword is detected in the first segment 121 without performing speech recognition.

At operation 606, when the hotword is not detected by the second stage hotword detector 220 in the first segment 121 of the audio data 120, the method 600 includes classifying, by the data processing hardware 103, 112, the first segment 121 of the audio data 120 as containing a negative hotword that caused a false detection of the hotword event in the streaming audio 118 by the first stage hotword detector 210. At operation 608, the method 600 includes updating, by the data processing hardware 103, 112, the first stage hotword detector 210 to prevent triggering the hotword event in subsequent audio data 120 that contains the negative hotword.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 7:
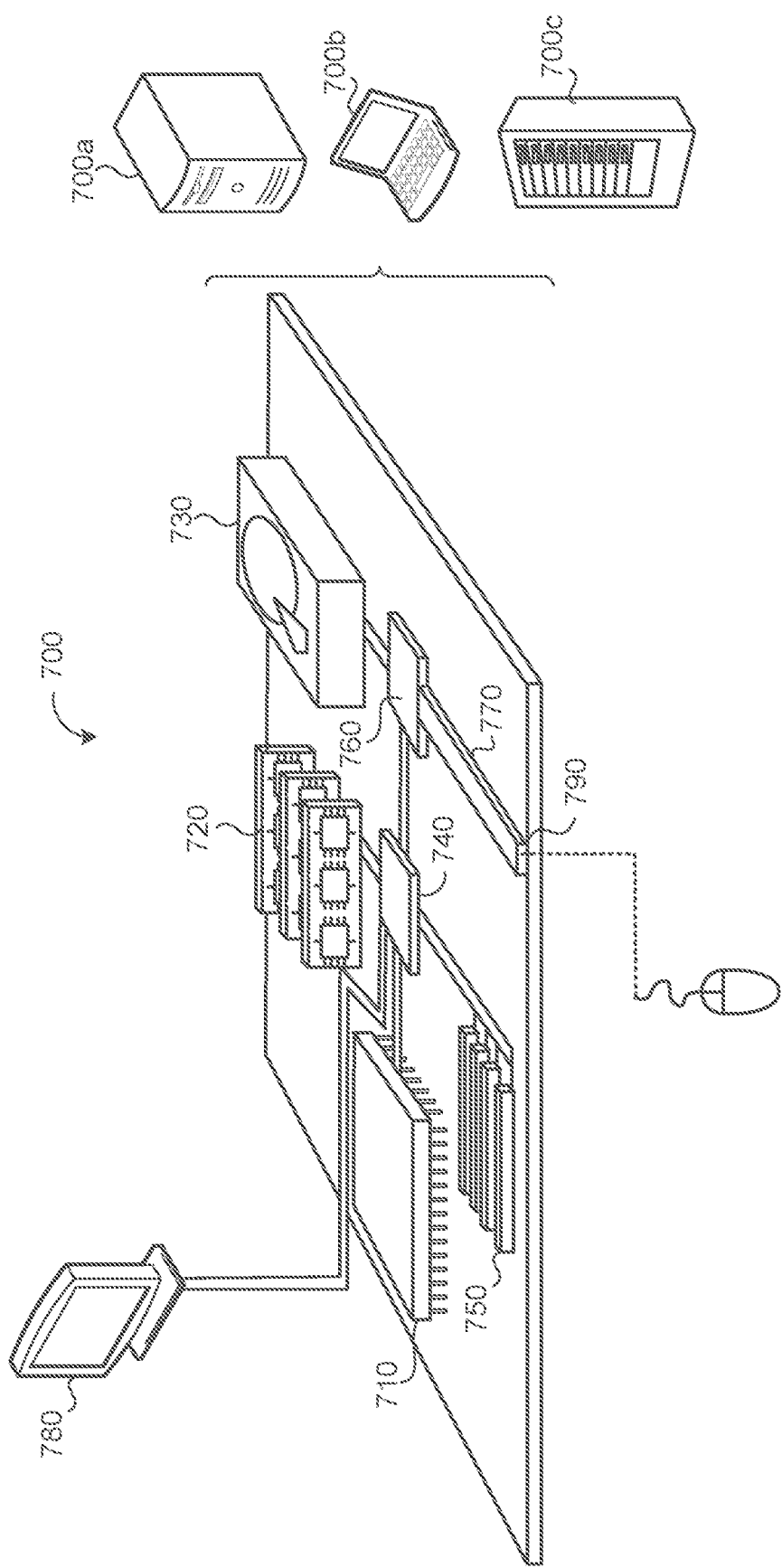
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at data processing hardware, audio data characterizing a hotword event detected by a first stage hotword detector in streaming audio captured by a user device;
   processing, by the data processing hardware, using a second stage hotword detector, the audio data to determine whether a hotword is detected by the second stage hotword detector in a first segment of the audio data, the second stage hotword detector different from the first stage hotword detector; and
   when the hotword is not detected by the second stage hotword detector in the first segment of the audio data:
   classifying, by the data processing hardware, the first segment of the audio data as containing a negative hotword that caused a false detection of the hotword event in the streaming audio by the first stage hotword detector; and
   based on the first segment of the audio data classified as containing the negative hotword, updating, by the data processing hardware, the first stage hotword detector to prevent triggering the hotword event in subsequent audio data that contains the negative hotword, the first stage hotword detector updated based on at least one of:
   a hotword detection probability score determined by the second stage hotword detector for the first segment of the audio data; or
   a negative hotword confidence score determined by the second stage hotword detector, the negative hotword confidence score classifying the first segment of the audio data as the negative hotword.

2. The method of claim 1, further comprising, when the hotword is not detected by the second stage hotword detector in the first segment of the audio data:
   suppressing, by the data processing hardware, a wake-up process on the user device for processing the hotword and/or one or more other terms following the hotword in the streaming audio; and
   determining, by the data processing hardware, whether an immediate follow-up query was provided by a user of the user device after suppressing the wake-up process on the user device,
   wherein classifying the first segment of the audio data as containing the negative hotword is further based on determining that no follow-up query was provided by the user of the user device after suppressing the wake-up process.

3. The method of claim 1, further comprising, when the hotword is detected by the second stage hotword detector in the first segment of the audio data:
processing, by the data processing hardware, a second segment of the audio data that follows the first segment of the audio data to determine whether the second segment of the audio data is indicative of a spoken query-type utterance; and
when the second segment of the audio data is not indicative of the spoken query-type utterance:
classifying, by the data processing hardware, the first segment of the audio data as containing the negative hotword; and
based on the first segment of the audio data classified as containing the negative hotword, updating, by the data processing hardware, the first stage hotword detector to prevent triggering the hotword event in subsequent audio data that includes the negative hotword.

4. The method of claim 3, further comprising, when the second segment of the audio data is not indicative of the spoken query-type utterance:
determining, by the data processing hardware, whether an immediate follow-up query was provided by a user of the user device,
wherein classifying the first segment of the audio data as containing the negative hotword is further based on determining that no follow-up query was provided by the user of the user device.

5. The method of claim 3, further comprising, when the second segment of the audio data is indicative of the spoken query-type utterance:
receiving, at the data processing hardware, a negative interaction result indicating that a user of the user device negatively interacted with results for the spoken query-type utterance provided to the user device;
classifying, by the data processing hardware, based on the received negative interaction result, the first segment of the audio data as containing the negative hotword; and
based on the first segment of the audio data classified as containing the negative hotword, updating, by the data processing hardware, the first stage hotword detector to prevent detecting the hotword event in subsequent audio data that contains the negative hotword.

6. The method of claim 1, further comprising, after receiving the audio data characterizing the hotword event detected by the first stage hotword detector:
receiving, at the data processing hardware, a negative user interaction indicating user suppression of a wake-up process on the user device,
wherein classifying the first segment of the audio data as containing the negative hotword is further based on the negative user interaction indicating user suppression of the wake-up process.

7. The method of claim 1, wherein updating the first stage hotword detector to prevent triggering the hotword event in subsequent audio data comprises providing the first segment of the audio data classified as containing the negative hotword to the user device, the user device configured to retrain the first stage hotword detector using the first segment of the audio data classified as containing the negative hotword.

8. The method of claim 7, wherein the user device is configured to retrain the first stage hotword detector by:

storing, in memory hardware of the user device, each instance of the first segment of the audio data classified as containing the negative hotword; and
retraining the first stage hotword detector based on an aggregation of the instances of the first segment of the audio data classified as containing the negative hotword stored in the memory hardware.

9. The method of claim 8, the user device is further configured to, prior to retraining the first stage hotword detector:
determine that a corresponding confidence score associated each instance of the first segment of the audio data classified as containing the negative hotword fails to satisfy a negative hotword threshold score; and
determine that a number of the instances exceeds a threshold number of instances.

10. The method of claim 1, wherein:
updating the first stage hotword detector to prevent triggering the hotword event in subsequent audio data comprises providing the first segment of the audio data classified as containing the negative hotword to the user device, the user device configured to:
obtain an embedding representation of the first segment of the audio data; and
store, in memory hardware of the user device, the embedding representation of the first segment of the audio data; and
the user device is configured to determine when the subsequent audio data characterizing the hotword event detected by the first stage hotword detector includes the negative hotword by:
computing an evaluation embedding representation for the subsequent audio data;
determining a similarity score between the embedding representation of the first segment of the audio data classified as the negative hotword and the evaluation embedding representation for the subsequent audio data; and
when the similarity score satisfies a similarity score threshold, determining that the subsequent audio data includes the negative hotword.

11. The method of claim 1, wherein:
the data processing hardware resides on a server in communication with the user device; and
the first stage hotword detector executes on a processor of the user device.

12. The method of claim 11, wherein processing the audio data to determine whether the hotword is detected by the second stage hotword detector in the first segment of the audio data comprises performing automated speech recognition to determine whether the hotword is recognized in the first segment of the audio data.

13. The method of claim 1, wherein the data processing hardware resides on the user device.

14. The method of claim 13, wherein:
the first stage hotword detector executes on a digital signal processor (DSP) of the data processing hardware; and
the second stage hotword detector executes on an application processor of the data processing hardware.

15. The method of claim 1, wherein the first stage hotword detector is configured to:
generate a probability score indicating a presence of the hotword in audio features of the streaming audio captured by the user device; and detect the hotword event in the streaming audio when the probability score satisfies a hotword detection threshold of the first stage hotword detector.

16. A system comprising:
data processing hardware; and
memory hardware in communication with the data processing hardware, the memory hardware storing instructions that when executed on the data processing hardware cause the data processing hardware to perform operations comprising:
receiving audio data characterizing a hotword event detected by a first stage hotword detector in streaming audio captured by a user device;
processing, using a second stage hotword detector, the audio data to determine whether a hotword is detected by the second stage hotword detector in a first segment of the audio data, the second stage hotword detector different from the first stage hotword detector; and
when the hotword is not detected by the second stage hotword detector in the first segment of the audio data:
classifying the first segment of the audio data as containing a negative hotword that caused a false detection of a hotword event in streaming audio by the first stage hotword detector; and
based on the first segment of the audio data classified as containing the negative hotword, updating the first stage hotword detector to prevent triggering the hotword event in subsequent audio data that contains the negative hotword, the first stage hotword detector updated based on at least one of:
a hotword detection probability score determined by the second stage hotword detector for the first segment of the audio data; or
a negative hotword confidence score determined by the second stage hotword detector, the negative hotword confidence score classifying the first segment of the audio data as the negative hotword.

17. The system of claim 16, wherein the operations further comprise, when the hotword is not detected by the second stage hotword detector in the first segment of the audio data:
suppressing a wake-up process on a user device for processing the hotword and/or one or more other terms following the hotword in the streaming audio; and
determining whether an immediate follow-up query was provided by a user of the user device after suppressing the wake-up process on the user device,
wherein classifying the first segment of the audio data as containing the negative hotword is further based on determining that no follow-up query was provided by the user of the user device after suppressing the wake-up process.

18. The system of claim 16, wherein the operations further comprise, when the hotword is detected by the second stage hotword detector in the first segment of the audio data:
processing a second segment of the audio data that follows the first segment of the audio data to determine whether the second segment of the audio data is indicative of a spoken query-type utterance; and
when the second segment of the audio data is not indicative of the spoken query-type utterance:
classifying the first segment of the audio data as containing the negative hotword; and
based on the first segment of the audio data classified as containing the negative hotword, updating the first stage hotword detector to prevent triggering the hotword event in subsequent audio data that includes the negative hotword.

19. The system of claim 18, wherein the operations further comprise, when the second segment of the audio data is not indicative of the spoken query-type utterance:
determining whether an immediate follow-up query was provided by a user of a user device,
wherein classifying the first segment of the audio data as containing the negative hotword is further based on determining that no follow-up query was provided by the user of the user device.

20. The system of claim 18, wherein the operations further comprise, when the second segment of the audio data is indicative of the spoken query-type utterance:
receiving a negative interaction result indicating that a user of a user device negatively interacted with results for the spoken query-type utterance provided to the user device;
classifying based on the received negative interaction result, the first segment of the audio data as containing the negative hotword; and
based on the first segment of the audio data classified as containing the negative hotword, updating the first stage hotword detector to prevent detecting the hotword event in subsequent audio data that contains the negative hotword.

21. The system of claim 16, wherein the operations further comprise, after receiving the audio data characterizing the hotword event detected by the first stage hotword detector:
receiving a negative user interaction indicating user suppression of a wake-up process on a user device,
wherein classifying the first segment of the audio data as containing the negative hotword is further based on the negative user interaction indicating user suppression of the wake-up process.

22. The system of claim 16, wherein updating the first stage hotword detector to prevent triggering the hotword event in subsequent audio data comprises providing the first segment of the audio data classified as containing the negative hotword to a user device, the user device configured to retrain the first stage hotword detector using the first segment of the audio data classified as containing the negative hotword.

23. The system of claim 22, wherein the user device is configured to retrain the first stage hotword detector by:
storing each instance of the first segment of the audio data classified as containing the negative hotword in the memory hardware of the user device; and
retraining the first stage hotword detector based on an aggregation of the instances of the first segment of the audio data classified as containing the negative hotword stored in the memory hardware.

24. The system of claim 23, the user device is further configured to, prior to retraining the first stage hotword detector:
determine that a corresponding confidence score associated each instance of the first segment of the audio data classified as containing the negative hotword fails to satisfy a negative hotword threshold score; and
determine that a number of the instances exceeds a threshold number of instances.

25. The system of claim 16, wherein:
updating the first stage hotword detector to prevent triggering the hotword event in subsequent audio data comprises providing the first segment of the audio data classified as containing the negative hotword to a user device, the user device configured to:
  obtain an embedding representation of the first segment of the audio data; and
  store, in the memory hardware of the user device, the embedding representation of the first segment of the audio data; and
the user device is configured to determine when the subsequent audio data characterizing the hotword event detected by the first stage hotword detector includes the negative hotword by:
  computing an evaluation embedding representation for the subsequent audio data;
  determining a similarity score between the embedding representation of the first segment of the audio data classified as the negative hotword and the evaluation embedding representation for the subsequent audio data; and
  when the similarity score satisfies a similarity score threshold, determining that the subsequent audio data includes the negative hotword.

26. The system of claim 16, wherein:
the audio data characterizes the hotword event detected by the first stage hotword detector in the streaming audio, the streaming audio captured by a user device;
the data processing hardware resides on a server in communication with the user device; and
the first stage hotword detector executes on a processor of the user device.

27. The system of claim 26, wherein processing the audio data to determine whether the hotword is detected by the second stage hotword detector in the first segment of the audio data comprises performing automated speech recognition to determine whether the hotword is recognized in the first segment of the audio data.

28. The system of claim 16, wherein:
the audio data characterizes the hotword event detected by the first stage hotword detector in the streaming audio, the streaming audio captured by a user device; and
the data processing hardware resides on the user device.

29. The system of claim 28, wherein:
the first stage hotword detector executes on a digital signal processor (DSP) of the data processing hardware; and
the second stage hotword detector executes on an application processor of the data processing hardware.

30. The system of claim 16, wherein the first stage hotword detector is configured to:
generate a probability score indicating a presence of the hotword in audio features of the streaming audio captured by a user device; and
detect the hotword event in the streaming audio when the probability score satisfies a hotword detection threshold of the first stage hotword detector.

* * * * *